INVENTOR.
Manabu Kashihara
BY
Pierce, Scheffler & Parker
Attorneys

July 1, 1969  MANABU KASHIHARA  3,452,622
VARIABLE SPEED TRANSMISSION OF CONCAVE CONE WHEEL TYPE
Filed Jan. 22, 1968  Sheet 5 of 5

INVENTOR.
Manabu Kashihara
BY
Pierce, Scheffler & Parker
Attorneys

United States Patent Office 3,452,622
Patented July 1, 1969

3,452,622
VARIABLE SPEED TRANSMISSION OF CONCAVE CONE WHEEL TYPE
Manabu Kashihara, Uji Kyoto, Japan, assignor to Shimpo Kogyo Kabushiki Kaisha, Kyoto, Japan, a corporation of Japan
Filed Jan. 22, 1968, Ser. No. 699,512
Claims priority, application Japan, Mar. 27, 1967, 42/19,041; Apr. 20, 1967, 42/25,278, 42/25,279, 42/25,280, 42/25,281, 42/25,282; Sept. 6, 1967, 42/56,747
Int. Cl. F16h *15/28, 37/06*
U.S. Cl. 74—796      9 Claims

ABSTRACT OF THE DISCLOSURE

A variable speed friction drive utilizing balls having a three point contact. Two points of contact are on opposing concave cone wheels and the third point is on a slightly beveled ring which surrounds the balls and cone wheels and is axially adjustable to change the transmission ratio.

---

This invention relates to a variable-speed transmission of type employing a pair of opposing concave cone wheels and a plurality of balls engaging with the cone wheels.

In the prior art, a transmission of this type includes a pair of oppositely arranged race members which are moved by an operating device which changes the distance between the wheels so as to vary the effective radii. However, the mechanism for moving the two race members in the casing of the transmission is relatively complex.

It is a principal object of the present invention to provide a transmission of the above mentioned type which has a simplified mechanism for varying the effective radii between the frictionally engaging members.

It is another object of the present invention to provide a transmission of the above mentioned type which operates noiselessly.

It is still another object of the present invention to provide a transmission of the above mentioned type which can be produced economically by relatively simple machinings.

The foregoing as well as other objects and advantages will become more apparent from the following description of various embodiments of the improved transmission when read in connection with the accompanying drawings in which:

Figure 1:
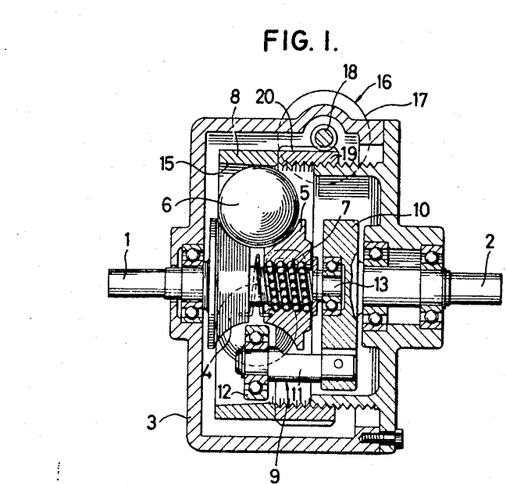
FIG. 1 is a longitudinal section view of a variable-speed transmission according to one embodiment of the present invention.

Referring to FIG. 1, a driving shaft 1 and a driven shaft 2 are arranged coaxially and supported by bearings on a casing 3. On the driving shaft 1, a pair of concave cone wheels 4, 5 are mounted face to face. Of these cone wheels 4, 5 one cone wheel 4 is integral with the driving shaft 1, but the other cone wheel 5 is engaged with the driving shaft 1 by means of a ball-screw device which is a type of contact pressure generating device. When the driving shaft 1 rotates in the direction of arrow S the cone wheel 5 moves leftwards. A plurality of balls 6 frictionally engage with the cone wheels 4, 5. Alternatively, as a means for connecting the cone wheels 4, 5 to the driving shaft 1 and as a means generating contact pressures between the cone wheels 4, 5 and the balls 6 any other known means may be employed.

The balls 6 establish a frictional contact with a stationary track ring 8. A carrier 9 is provided to effect a revolution of balls 6 about the driving shaft 1 to the driven shaft 2, and this carrier 9 consists of a base member 10, a plurality of pins 11 extended from the base member 10 and rollers 12 attached to the pins 11. The base member 11 may be provided as an integral part of the driven shaft 2 or as a member fixed to the end of driven shaft 2. The rollers 12 of carrier 9 engage with the balls 6, and the base member 10 supports the end 13 of driving shaft 1 by means of an anti-friction bearing. The carrier 9 supports the balls at a predetermined angular distance apart.

The track ring 8 is one which has an internal surface of small taper, that is to say, a conical surface which has a small vertical angle. This track ring is shifted axially by means of an operating device 16 consisting of a hand wheel 17, a worm 18 on the hand shaft and a feed nut 19 which engages with the worm 18 at its worm-wheel portion 20 provided on the outer surface. The inner screw thread on feed nut 19 meshes with a stationary screw thread which is a part of casing 3 or a member attached to the casing. The screw nut 19 has two functions, that is to say, a function for advancing the track ring 8 leftwards and a function for preventing rotation of ring 8. For the latter function the nut 19 engages with the ring 8 by a dog or pins. It is possible to make the portion of ring 8 and nut 19 integrally, but this construction is not advantageous from the standpoint of heat-treatment, machining and cost of material. The track ring 8 has a slight amount of flexibility and on account of this flexibility, generation of too large a contact pressure and noise owing to various errors in dimensions are avoided.

Figure 2:
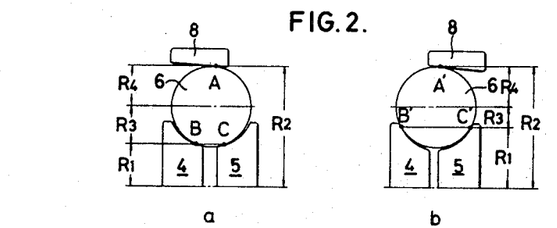
FIG. 2 is a diagrammatic drawing showing the effective radii between the concave cone wheels, the balls and the ring of the transmission shown in FIG. 1.

The states of contact between the cone wheels 4, 5, the balls 6 and the ring 8 are varied by the device 16. FIG. 2 shows two states as examples. In this figure, A, A' are contact points between the ring 8 and the ball 6; B, B' are contact points between the cone wheel 4 and the ball 6; C, C' are contact points between the cone wheel 5 and the ball 6.

The relation between the speed $N_2$ of driven shaft 2 and the speed $N_1$ of driving shaft 1 is shown by the following equation.

$$N_2 = \frac{1}{1+\left(\frac{R_3}{R_1} \cdot \frac{R_2}{R_4}\right)} N_1$$

In this equation, $R_1$, $R_2$, $R_3$ and $R_4$ are the effective radii shown in FIG. 2 and, as the taper of the internal surface 15 is small variation of $R_2/R_4$ is very small.

Advantages and features of the transmission are derived from the employment of ring 8 which has an internal surface 15 with small taper. A change in speed can be executed only by shifting the ring 8 axially and, for this speed-change operation, the necessary force for shifting ring 8 is relatively small because of the small taper of surface 15. In the prior art, a corresponding part of ring 8 is constituted by two rings each of which frictionally contacts at one point for each ball 6. Though, in this construction, each ball makes contact with the rings at two points, such a two-point-contact is unnecessary, because the radii of the rings are sufficiently large and the contact condition is that of concave surface to convex surface. Of course, the above contact condition is established in planes perpendicular to the central axis of the transmission.

Figure 3:
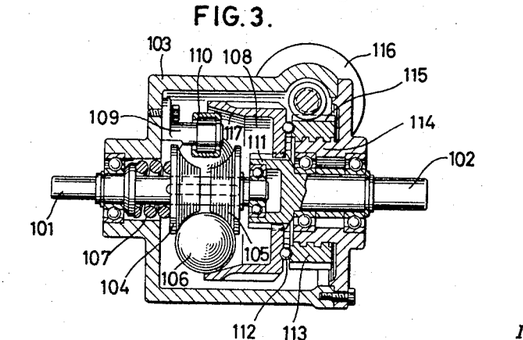
FIG. 3 is a longitudinal section view of a modification of the transmission shown in FIG. 1.

The transmission shown in FIG. 3 is a modification of that shown in FIG. 1. In FIG. 3, a driving shaft 101 and a driven shaft 102 are arranged coaxially and supported by bearings on a casing 103. On the driving shaft 101 a pair of concave cone wheels 104, 105 are mounted face to face by a feather key. On the back side of the cone wheel 104, there is provided a coiled spring 107 for generating contact pressure between frictionally engaging members. A plurality of balls 106 frictionally engage with the cone wheels 104, 105 and a rotatable ring 108. To prohibit the revolution of the balls 106, there are provided as a carrier a plurality of stationary pins 109 carrying rollers 110 and these rollers engage with the balls 106. The rotatable ring 108 is splined to the end portion 111 of driven shaft 102 or splined to a member fixed to the driven shaft 102. The ring 108 engages with a feed nut 113 of a speed-change-operating device by means of a thrust bearing 112. This device consists of a feed nut 113, and a worm-and-worm wheel device 115 actuated by hand wheel 116. The above operating device may be substituted by any other device which shifts a rotating ring axially. The rotatable ring 108 is one which is provided with an internal surface of small taper. This ring is shifted axially by the above described operating device.

The relation between the speed $N_2$ of driven shaft 102 and the speed $N_1$ of driving shaft 101 is shown by the following equation $$N_2 = \frac{R_1}{R_3} \cdot \frac{R_4}{R_2} N_1$$

In this equation $R_1$–$R_4$ also represent the effective radii shown in FIG. 2.

In this specification, the term "stationary ring" and the term "rotatable ring" are used in various places. The former term "stationary ring" indicates that which does not rotate for a power transmitting purpose. On the other hand the latter term "rotatable ring" indicates that which rotates for a power transmitting purpose.

Figure 4:
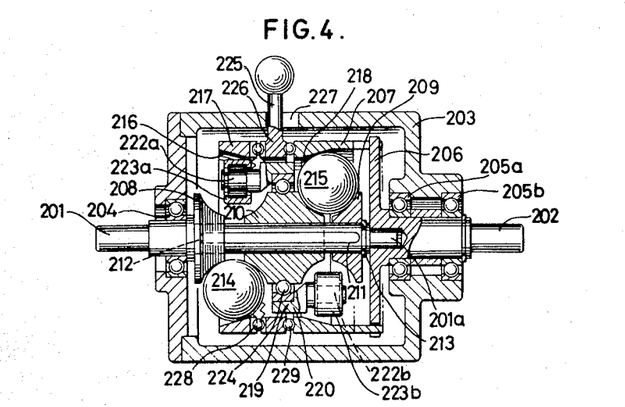
FIGS. 4 and 5 are drawings similar to FIG. 1 and FIG. 2 of another embodiment of the present invention.

In FIG. 4, a driving shaft 201 and a driven shaft 202 are arranged coaxially and supported by bearings 204, 205a, 205b on a casing 203. The driving shaft 201 is also supported at its end 201a by a member 206 which is provided integral with the driven shaft 202 or provided as an attached member to the driven shaft 202. The member 206 is that for imparting rotation of a rotatable ring 207 to the driven shaft 202. On the driving shaft 201, three concave cone wheels 208, 209, 210 are mounted by means of a feather key 211. All of these concave cone wheels rotate with the driving shaft 201. Of these cone wheels, the cone wheel 208 and the cone wheel 209 are stopped in their axial movements on the driving shaft 201 by a collar 212. And by a snap ring 213 respectively, however, the middle cone wheel 210 can be shifted axially by a speed changing device. Balls 214 of a first row and balls 215 of a second row are provided. The balls of the first row frictionally engage with the cone wheel 208 and the cone wheel 210. On the other hand, the balls of the second row frictionally engage with the cone wheel 209 and the cone wheel 210. The balls 214 of the first row also frictionally engage with a conical internal surface 216 of a track ring 217, and similarly, balls 215 of the second row also frictionally engage with a conical internal surface 218 of a rotatable ring 207. The above mentioned conical internal surface 216 and the conical internal surface 218 are those with small vertical angle similar to the conical internal surface 15 of ring 8 of the transmission shown in FIG. 1. The balls 214 of the first row and the balls 215 of the second row are operatively connected to a carrier 219 which consists of annular base 220, pins 222a, 222b extending from the annular base 220, on both sides and rollers 223a, 223b mounted on these pins, and the annular base 220 is supported rotatably by a bearing 224 provided on the periphery of cone wheel 210. The carrier 219 is a member for supporting the balls at a predetermined angular distance. The track ring 217 is a stationary ring, but the ring 207 is a rotatable one and its rotation is imparted to the driven shaft 202. These rings 217, 207 can be shifted in the same direction simultaneously by a member 226, for the purpose of speed change, which is arranged between the ring 217 and the ring 207. A shank of handle 225 provided for the member 226 extends through a slot 227 to guide the member 226 axially. Contact pressures between the cone wheels, the balls and the rings are created by a device 228 of roller-and-cam type or ball-and-cam type. The cam surfaces are provided on opposing end surfaces of the rings 217, 207. As the member 226 is stationary and on the other hand the ring 207 rotates, a thrust bearing 229 is provided between the member 226 and the ring 207. Further, since the ring 207 must be able to move axially and at the same time must impart its rotation to the driven shaft 202, slots are provided on the end portion of ring 207 into which radial projections of member 206 extend. The above construction at the end of ring 207 may be substituted by any other construction which permits relative axial movement between two power transmitting elements.

The above explained transmission in FIG. 4 includes two sets of power transmitting parts, and for these parts there is employed a common carrier which revolves balls of the first and second rows. Further, in this transmission, the middle concave cone wheel 210 is a common one for these parts and is provided with concave conical surfaces on both sides. As far as the concave cone wheel 210 is concerned, this wheel may be divided into two parts which have the same profile as the cone wheels 208, 209. In such a divided construction, the bearing 224 which supports the carrier 219 rotatably may be supported by a bushing arranged between the cone wheels. The contact pressure generating device 228 may be substituted by any other known type and further may be arranged on another part of the transmission.

Figure 5:
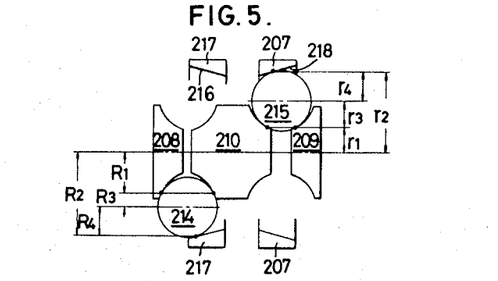

Effective radii of elements of the transmission are shown in FIG. 5 and putting $R_3/R_1 = a$      $r_3/r_1 = a'$
$R_4/R_2 = b$      $r_4/r_2 = b'$ The relation between the speed $N_1$ of driving shaft 201 and the speed $N_2$ of driven shaft 202 is shown by the following equation.

$$N_2 = \frac{a'b - ab'}{a'(a+b)} N_1$$

As seen in this equation, when the wheel 210 takes its central position, that is to say, when $a = a'$, $b = b'$ the speed $N_2$ of driven shaft 202 is zero, and further the direction of rotation of the driven shaft 202 changes when the wheel 210 is shifted over its central position. In the case of this transmission, speed change operation can be executed easily as in the case of the transmissions shown in FIG. 1 and FIG. 3. Accordingly, in addition to a condition capable of obtaining zero speed of driven shaft 202, this transmission may preferably be employed for a servo-motor.

Figure 6:
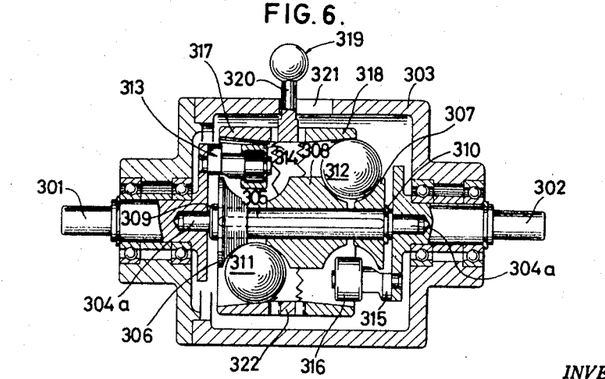
FIG. 6 is a longitudinal section view of another embodiment of the present invention.

In FIG. 6, a driving shaft 301 and a driven shaft 302 are arranged coaxially and supported by bearings on a casing 303. Between the opposing portions of driving shaft 301 and the driven shaft, there is provided a coaxial intermediate shaft 305, the ends 304a, 304b of which are rotatably supported by the driving shaft and driven shaft respectively. The ends of the intermediate shaft may be supported by members which are fixed to the driving shaft and driven shaft respectively. The intermediate shaft 305 is a supporting member for three concave cone wheels 306–308. Of these cone wheels, the left and right cone wheels 306, 307 take definite positions on the intermediate shaft 305, but the middle cone wheel 308 is shifted leftwards or rightwards when the speed of the transmission is varied. Accordingly, the cone wheel 306 or the cone wheel 307 may be provided as an integral part of the intermediate shaft 305. However, it is preferable to manufacture both of these cone wheels 306, 307 as independent members from the standpoint of working. The middle cone wheel 308 is a composite wheel which is provided with concave conical surfaces on both sides. However, this cone wheel 308 may be constituted by two cone wheels which have profiles corresponding to those of the cone wheels 306, 307. The cone wheels 306–308 are mounted on the intermediate shaft 305 by means of a feather key. There are provided a collar 309 and a snap ring 310 on the intermediate shaft 305 to avoid shipping out of the cone wheels 306, 307 respectively. One group of balls 311 and another group of balls 312 are provided which frictionally engage with concave cone wheels 306, 308, and concave cone wheels 307, 308 respectively. The balls 311 of the first group engage with rollers 314 which are rotatably supported by a carrier 313 attached to the end of driving shaft 301. On the other hand, the balls 312 of the second group engage with rollers 316 which are rotatably supported by a carrier 315. Accordingly, the speed of rotation of the balls 311 and the speed of rotation of the balls 312 are equal to the speed of rotation of the driving shaft 301 and the speed of rotation of the driven shaft 302 respectively.

For the balls 311, 312, there are provided track rings 317, 318. The internal surfaces of these rings 317, 318 are conical ones of small vertical angle. The diameters of the internal surfaces of the rings 317, 318 increase towards the outside. The rings 317, 318 are stationary ones and they are shifted in the same direction simultaneously by means of an operating device 319 to vary the speed of the driven shaft 302. The handle 320 of operating device 319 passes through a slot 321 provided on the casing 303 and guided axially by this slot. The handle 320 is extended from a cam ring 322 which is a member for generating contact pressure between frictionally engaging members. Cam surfaces of the ring 322 are provided on both sides of it and these cam surfaces cooperate with the end cam surfaces of the rings 317, 318 so as to constitute contact pressure generating devices. These devices may be substituted also by other ones which are similar to the device 228 shown in FIG. 4.

The part consisting of the balls 311, the cone wheels 306, 308 and the track ring 317 has a similar construction with that of the part consisting of the balls 312, the cone wheels 307, 308 and the track ring 318. In case of the former part, the carrier 313 is situated on the side of the input and attached to the driving shaft 301. However, in case of the latter part, the carrier 315 is situated on the side of the output and is attached to the driven shaft 302.

Figure 8:
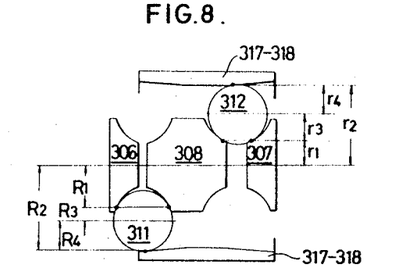
FIG. 8 is a diagrammatic drawing showing the effective radii between the frictionally engaging members in the transmission shown in FIG. 6 and FIG. 7.

Assuming the effective radii of the elements 306–308, 311–312 and 317–318 as shown in FIG. 8, and putting $$\frac{R_3}{R_1}=a \quad \frac{r_3}{r_1}=a'$$

$$\frac{R_4}{R_2}=b \quad \frac{r_4}{r_2}=b'$$

the relation between the speed of rotation $N_2$ of driven shaft 302 and the speed of rotation $N_1$ of driving shaft 301 is shown by the following equation.

$$N_2=\left(\frac{a+b}{b}\right)\left(\frac{b'}{a'+b'}\right)N_1$$

Figure 7:
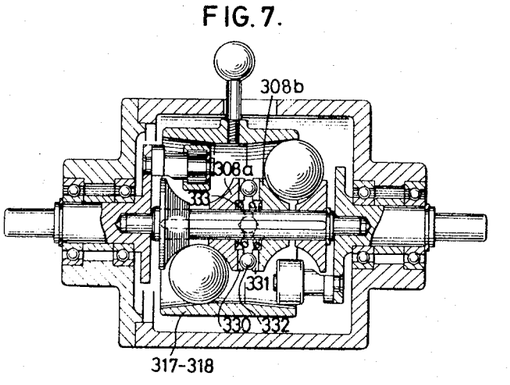
FIG. 7 is a longitudinal section view of a modification of the transmission shown in FIG. 6.

As the vertical angle of the internal surfaces of the rings 317, 318, is small and $b$, $b'$ vary in a little degree, the speed $N_2$ of driven shaft 302 is subject to $a$ and $a'$ principally. When the handle 319 is moved to its central position, $a$ and $b$ are equal to $a'$ and $b'$ respectively. The driven shaft 302 may be rotated faster than the driven shaft 301 when the handle 319 is shifted from its central position, and vice versa. The rings 317, 318 may be constructed as an integral piece, if the contact pressure generating devices are provided on the other part or parts of the speed transmission. The reason why two rings 317, 318 are provided is to provide cam surfaces of the pressure generating devices. Accordingly, if the pressure generating device is provided as shown in FIG. 7, then, the rings 317, 318 may be constructed as an integral piece as depicted there. In case of the speed transmission shown in FIG. 7, the middle cone wheel is composed of two parts 308a, 308b. And the contact pressure generating device corresponding to those which are provided for the rings 317, 318 in FIG. 6 is provided between these parts or cone wheels 308a, 308b. That is to say, in case of the speed transmission shown in FIG. 7, a contact pressure generating device consists of a cam surface 330 at the end of the cone wheel 308a, a cam surface 331 at the end of the cone wheel 308b and a plurality of balls 332 arranged between these cam surfaces. The balls 332 are supported in their correct positions by a retainer or a cage, but this supporting means is not shown in FIG. 7. A coiled spring 333 is inserted between the cone wheels 308a, 308b to secure initial contact of balls 332 for the cam surfaces 330, 331. Otherwise, the construction and function of the elements of the speed transmission shown in FIG. 7 are similar to those of the speed transmission shown in FIG. 6. In case of the speed transmissions shown in FIGS. 6, 7, the contact pressures acting on the cone wheels merely create internal stress and the axial forces from balls to rings balance nearly. Accordingly, these speed change gears are capable of being operated lightly by their handles.

Figure 9:
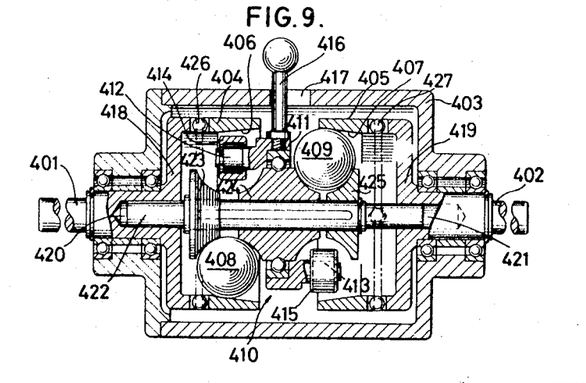
FIGS. 9 and 10 are drawings similar to FIG. 1 and FIG. 2 of another embodiment of the present invention.

The speed transmission shown in FIG. 9 is another embodiment of the present invention and also employs rings which are provided with internal surfaces of small taper. In this figure, a driving shaft 401 and a driven shaft 402 are arranged coaxially and supported rotatably by bearings on a casing 403. It will be understood that the driving shaft 401 may be driven shaft and that the driven shaft 402 may be a driving shaft, owing to the symmetrical construction of this gear. The term "driving shaft" is merely used for a convenience of explanation. A pair of tapered rings 404, 405 are provided. Of these rings 404, 405, one ring 404 rotates with the driving shaft 401 and the other ring 405 rotates with the driven shaft 402. The internal surfaces 406, 407 of these rings are conical ones of small vertical angle, the large ends of which are arranged face-to-face. A plurality of balls 408 and a plurality of balls 409 frictionally engage with the internal surfaces 406, 407 respectively. A carrier 410 consists of a central annular portion 411, arms 412, 413 extending from the annular portion and rollers 414, 415 supported by the arms rotatably. The rollers 414, 415 engage with the balls 408, 409 respectively so as to determine the relative position of the balls in the circumferential direction. The carrier 410 is a non-rotatable member which is shifted axially by an operating shaft 416 along a slot 417 provided by the casing 403. There are provided deep holes 420, 421 at the end portions 418, 419 of the driving shaft 401 and the driven shaft 402. These holes 420, 421 are provided for supporting an intermediate shaft 422 coaxially with the driving shaft and the driven shaft. The end portions 418, 419 may be another member attached to the driving shaft and the driven shaft respectively. Three concave cone wheels 423, 424, 425 are mounted on the intermediate shaft 422 in the same manner as the concave cone wheels 208, 209, 210 of the speed transmission shown in FIG. 6. The locations of cone wheels 423, 425 on the intermediate shaft 422 are fixed, but the location of the middle cone wheel 424 on the intermediate shaft 422 is changeable. This cone wheel 424 is shiftable leftwards and rightwards to vary the speed of driven shaft 402. As far as the functions are concerned, the cone wheels 423, 425 may be integral with the intermediate shaft 422. Though the cone wheels 423, 425 are located at fixed positions on the intermediate shaft 422, they move with the intermediate shaft 422, when the speed of driven shaft 402 is changed. The middle cone wheel 424, that is to say, the axially movable cone wheel is provided with concave conical surfaces on both sides. As to these latter two conical surfaces, one is opposite the surface of cone wheel 423, and the other is opposite the surface of cone wheel 425. The cone wheel 424 may be also composed of two cone wheels which are formed similar to the cone wheel 423 or the cone wheel 425. And, in this case, the cone wheels may be arranged back to back, and further, the portion of the bearing which supports the annular portion 411 of carrier 410 may be arranged between the cone wheels. The power transmitting system consisting of the cone wheels 423, 424 frictionally engaging with the first set of balls 408 and the first ring 404, and the second power transmitting system consisting of the cone wheels 424, 425 frictionally engaging with the second row of balls 409 and the second ring 405 are coupled through the carrier 410 and intermediate shaft 422. Contact pressures between the frictionally engaging elements, that is to say, the contact pressures between said balls, cone wheels and rings are generated by contact pressure generating devices 426, 427 of a cam and ball type which are provided between the end portions 418, 419 and the rings 404, 405. When the middle cone wheel 424 is composed of two cone wheels as already explained, the contact pressure generating devices may be substituted by another ball and cam type contact pressure generating device which is provided between these cone wheels. Then, the rings 404 and 405 may be integral with the end portion 418 and the end portion 419 respectively, or may be members which are fixed to the end portion respectively.

Figure 10:
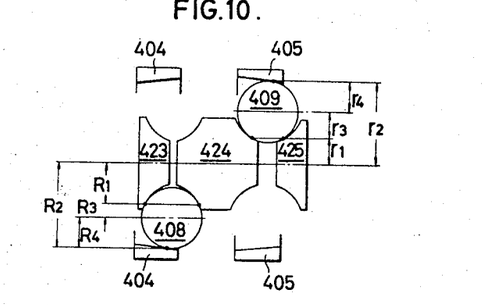

Assuming the relation between the effective radii shown in FIG. 10 as follows, $$\frac{R_3}{R_1}=a \quad \frac{r_3}{r_1}=a'$$

$$\frac{R_4}{R_2}=b \quad \frac{r_4}{r_2}=b'$$

the relation between the speed of rotation $N_2$ of the driven shaft 402 and the speed of rotation $N_1$ of the driving shaft 401 is shown by the following equation $$N_2=\frac{a}{b}\cdot\frac{b'}{a'}N_1=\frac{b'}{b}\cdot\frac{a}{a'}N_1$$

In the above equation, $b'/b$ is nearly constant. When the handle 416 is shifted to its central position $a$ and $b$ are equal to $a'$ and $b'$ respectively. Accordingly, at the central position of handle 416, the speed of rotation $N_2$ of the driven shaft 402 is equal to the speed of rotation $N_1$ of the driving shaft 401. Consequently, in the case of the variable speed transmission shown in FIG. 9, an increased speed, a decreased speed and the same speed are obtained at the driven shaft 402. It may be noticed that, in case of the variable speed transmission shown in FIG. 9, thrusting forces will be transmitted to the driving shaft 401 and the driven shaft 402, but these thrusting forces are quite small since the vertical angles of the internal conical surfaces 406, 407 are made small so as to reduce the axial components of the contact pressures. Further, it will be noticed that the thrusting forces acting on the carrier 405 and the cone wheels 423, 424, 425 are nearly balanced. Accordingly, in the case of the variable speed transmission shown in FIG. 9, the handle 416 is also capable of being operated with very little force.

Figure 11:
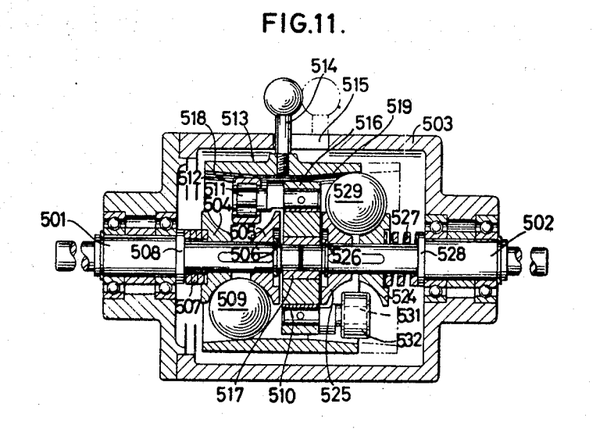
FIGS. 11 and 12 are drawings similar to FIG. 9 and FIG. 10 of another embodiment of the present invention.

Referring to the variable speed transmission shown in FIG. 11, there are provided coaxial shafts 501, 502 supported by bearings on a casing 503. The shafts 501 502 may be the driving shaft and the driven shaft respectively, and vice versa. Two concave cone wheels 504, 505 are mounted on the driving shaft 501 to rotate with it. Among these cone wheels 504, 505, the cone wheel 505 arranged on the driven side is prevented from slipping out by a snap ring 506. The cone wheel 505 rotates with the driving shaft, but is not shifted axially. On the other hand, the cone wheel 504 arranged outside is an axially movable one and is urged by a spring 507 for generating contact pressure which abuts at one end against a collar 508 on the driving shaft 501. The cone wheels 504, 505 are the first set of cone wheels, and a plurality of balls 509, that is to say the balls of a first set frictionally engage with these cone wheels. A carrier 510 is provided in order to maintain a predetermined relative angular relation of balls 509, and this carrier 510 supports these balls 509 by rollers 512 on pins 511 extended from its ring portion 516 rotatably mounted on a bushing 517 in which the opposite ends of the driving shaft and driven shaft are received. A track ring 513 similar to that of the variable speed transmission shown in FIG. 7 is provided, and this ring is operated by a handle 514 extending from it through a slot 515 on the casing 503.

As the construction on the side of driven shaft 502 is the same as that on the side of the driving shaft 501, various parts of this portion are shown by numerals which are larger than those of the corresponding parts of the driving side by twenty. The carrier 510 which is provided with the pins 511 and the rollers 512 for the purpose of holding the first set of balls 509 also is provided with a plurality of pins 531 and rollers 532 supported by them for the purpose of holding the second set of balls 529. This carrier 510 is an element which transmits the revolution of the balls 509 of a first set to the driven side by revolution of the balls 529 of the second set. The internal surfaces 518, 519 of track ring 513 with which the first and second sets of balls 509, 529 frictionally engage are also conical surfaces of small vertical angle. As the balls 509, 529 are constrained in their movements in a radial direction, contact points between the frictionally engaging members are changed when the track ring 513 is shifted axially. The relation between the speed of rotation of the driving shaft $N_1$ and the speed of rotation $N_2$ of the driven shaft 502 is shown by the following equation.

$$N_2=\frac{b}{a+b}\cdot\frac{a'+b'}{b'}N_1$$

Figure 12:
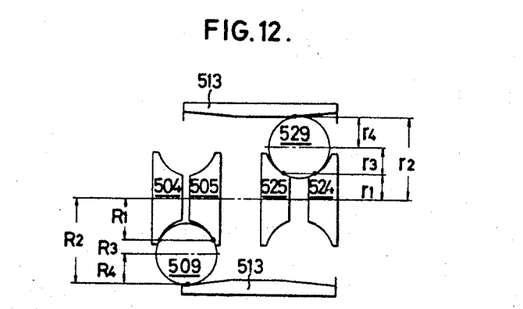

Wherein:

$$a=\frac{R_3}{R_1} \quad b=\frac{R_4}{R_2}$$

$$a'=\frac{r_3}{r_1} \quad b'=\frac{r_4}{r_2}$$

and R, r are the radii shown in FIG. 12.

$N_2$ is equal to $N_1$ when the handle 514 is shifted to its central position. As the thrusting forces due to the contact pressures create merely internal stresses, speed change operation is executed lightly, and thrust bearings are not used. Further, this speed change gear is composed of simple elements and may be produced economically, readily assembled and disassembled enabling easy maintenance.

Figure 13:
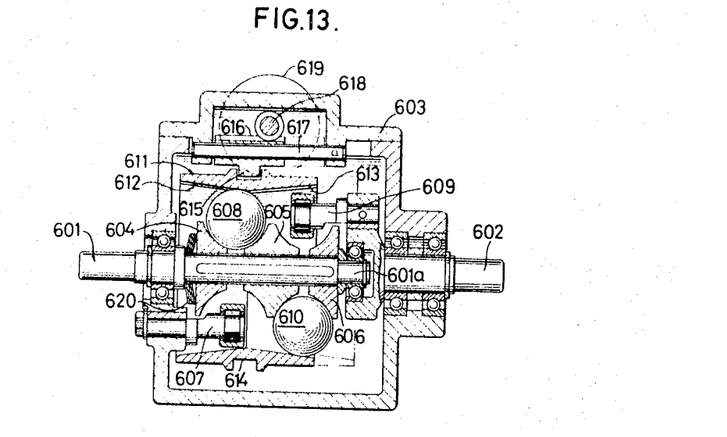
FIGS. 13 and 14 are drawings similar to FIG. 9 and FIG. 10 of still another embodiment of the present invention.
Figure 14:
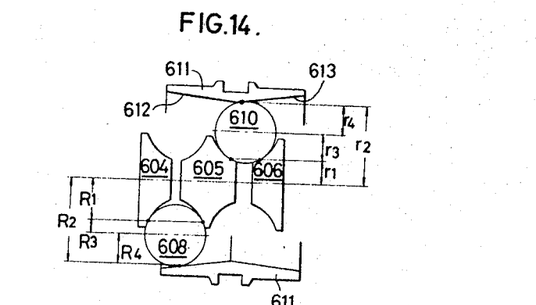
Figure 15:
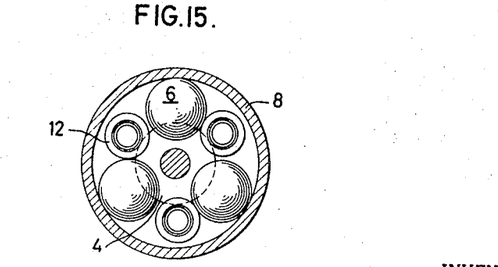
FIG. 15 is a view showing the relation between the concave cone wheel, the balls and the ring of the transmissions shown in FIGS. 1 to FIG. 14, and in this view the numerals correspond to those of the members of the transmission shown in FIG. 1.

The variable transmission shown in FIG. 13 is an embodiment wherein three concave cone wheels are mounted on a driving shaft. In this transmission, a driving shaft 601 and a driven shaft 602 are also arranged coaxially and supported by bearings on a casing 603. The driven shaft 601 is also supported at its inner end 601a by an inner portion of driven shaft 602. Three concave cone wheels 604, 605, 606 are mounted so as to rotate with it. Among these wheels, the cone wheels 604, 606 are those which are not shifted axially even when the speed of driven shaft 602 is varied. On the other hand the middle cone wheel 605 is shifted axially to change the speed of the driven shaft. The middle cone wheel 605 is provided with concave conical surfaces on both sides. This cone wheel may also be composed of two cone wheels arranged back-to-back. A plurality of balls 608 frictionally engage with the cone wheels 604, 605 and maintain their relative angular relations suitably by a stationary carrier 607. Further, a plurality of balls 610 frictionally engage with the cone wheels 605, 606 and maintain their relative positions by a rotatable carrier 609 which transmit the revolution of balls 610 to the driven shaft 602. There is provided a rotatable ring 611 having a pair of internal surfaces 612, 613 which are conical ones of a small vertical angle. The diameters of these internal surafces 612, 613 increase gradually in the outward direction. The ring 611 may be composed of two rings which engage mutually by suitable dog means. The speed of driven shaft 602 is changed by shifting the ring 611 axially. Shown in FIG. 14 is a state wherein the ring 611 is shifted rightwards to its extreme position so as to allow the ring 611 to frictionally engage with the balls 608 at its large diameter side of the internal surface 612, and, on the other hand, to allow the ring 611 to frictionally engage with the balls 609 at its small diameter side of the internal surface 613. An annular groove 614 is provided on the periphery of ring 611 into which a projection of rack gear 616 extends. The rack gear 616 meshes with pinion gear 618 and is shifted axially along a slot 617 by a hand wheel 619 which rotates pinion gear 618.

Assuming ratios of effective radii shown in FIG. 14 as follows, $$\frac{R_3}{R_1}=a \quad \frac{R_4}{R_2}=b$$

$$\frac{r_3}{r_1}=a' \quad \frac{r_4}{r_2}=b'$$

the relation between the speed of rotation $N_1$ and the speed of rotation $N_2$ of the driven shaft is shown by the following equation.

$$N_2=\frac{ab'-a'b}{a(a'+b')}N_1$$

As shown in this equation, when $a$ is equal to $a'$ and $b$ is equal to $b'$, that is to say, when the ring 611 is shifted to its central position, $N_2$ is equal to zero. The direction of rotation of driven shaft 602 changes when the ring 611 is shifted over from the central position. In the case of the embodiment shown in FIG. 13, laminated cup-shape-springs 620 are employed as a contact pressure generating device. However, it will be easily understood that the springs 620 may be replaced by other devices of a cam type which are shown in the embodiments. The variable speed transmission shown in FIG. 13 may preferably be used for a servo-system.

I claim:

1. In a variable-speed transmission, the combination comprising at least one transmission component constituted by at least a pair of opposingly related concave cone wheels arranged coaxially, a ring surrounding said cone wheels coaxially and spaced radially therefrom, said ring including a conical internal surface having a small vertical angle, a plurality of balls located between and frictionally engaging said cone wheels and ring, each of said balls establishing a three-point frictional contact, one point of which is between the ball and said conical internal surface of said ring and the other two points being between the ball and said cone wheels respectively, means for supporting said balls at a predetermined angular distance apart around the axis of said cone wheels, and means for producing relative axial displacement between said balls and ring thereby to effect a corresponding change in the transmission ratio.

2. A variable-speed transmission as defined in claim 1 which further includes a driving shaft and a driven shaft arranged coaxially, said cone wheels being mounted upon and rotated by said driving shaft, and means for generating contact pressures between said cone wheels, balls and ring, wherein said means for supporting said balls includes a carrier member which also imparts ball rotation to said driven shaft to effect its rotation, and wherein said means for producing relative axial displacement as between said balls and rings includes means for shifting said ring in an axial direction, said ring being non-rotatably mounted.

3. A variable-speed transmission as defined in claim 1 which further includes a driving shaft and a driven shaft arranged coaxially, said cone wheels being mounted upon and rotated by said driving shaft, and means for generating contact pressures between said cone wheels, balls and ring, wherein said means for supporting said balls includes a stationary carrier member, and wherein said means for producing relative axial displacement as between said balls and rings includes means for shifting said ring in an axial direction, said ring being mounted also for rotation about its axis and being coupled to said driven shaft for effecting its rotation.

4. A variable-speed transmission as defined in claim 1 which further includes a driving shaft and a driven shaft arranged co-axially, wherein three concave cone wheels are mounted upon and rotated by said driving shaft, the middle one of said cone wheels being axially shiftable on said driving shaft and being provided with concave surfaces at its opposite sides which cooperate respectively with the concave surfaces of the other two cone wheels to establish two sets of opposing conical surfaces, wherein first and second sets of balls are provided in frictional engagement respectively with said sets of opposing conical surfaces, wherein said ring which surrounds said cone wheels and balls includes a first non-rotational ring part which is axially displaceable and includes a conical internal surface frictionally engaging said first set of balls, and a second ring part which is rotational as well as axially displaceable and includes a conical internal surface frictionally engaging said second set of balls, said second ring part being coupled to said driven shaft, means for simultaneously shifting said first and second ring parts axially in the same direction, and means for generating contact pressures between said cone wheels and said balls and said ring parts.

5. A variable-speed transmission as defined in claim 1 which further includes a driving shaft and a driven shaft arranged coaxially, an intermediate shaft located coaxially with and between said driving and driven shafts, said intermediate shaft being supported for rotation by the ends of said driving and driven shafts, wherein three concave cone wheels are mounted upon and roated by said intermediate shaft, the middle one of said cone wheels being axially shiftable on said intermediate shaft and being provided with concave surfaces at its opposite sides which cooperate respectively with the concave surfaces of the two other cone wheels to establish two sets of opposing conical surfaces, wherein first and second sets of balls are provided in frictional engagement respectively with said sets of opposing conical surfaces, wherein said means for supporting said balls at a predetermined angular distance apart around the axis of said cone wheels comprises first and second carriers connected respectively to said driving and driven shafts, wherein said ring which surrounds said cone wheels and balls includes first and second non-rotational but axially displaceable ring parts which include conical internal surfaces frictionally engaging respectively said first and second sets of balls, means for simultaneously shifting said first and second ring parts axially in the same direction, and means for generating contact pressures between said cone wheels and said balls and said ring parts.

6. A variable-speed transmission as defined in claim 1 which further includes a driving shaft and a driven shaft arranged coaxially, an intermediate shaft located coaxially with and between said driving and driven shafts, said intermediate shaft being supported for rotation by the ends of said driving and driven shafts, wherein three concave cone wheels are mounted upon and rotated by said intermediate shaft, the middle one of said cone wheels being axially shiftable on said intermediate shaft and being provided with concave surfaces at its opposite sides which cooperate respectively with the concave surfaces of the two other cone wheels to establish two sets of opposing conical surfaces, wherein first and second sets of balls are provided in frictional engagement respectively with said sets of opposing conical surfaces, wherein said means for supporting said balls at a predetermined angular distance apart around the axis of said cone wheels comprises first and second carriers connected respectively to said driving and driven shafts, wherein said ring which surrounds said cone wheels and balls is non-rotational but axially displaceable and includes first and second conical internal surfaces frictionally engaging respectively said first and second sets of balls, means for shifting said ring axially and means for generating contact pressures between said cone wheels and said balls and said ring.

7. A variable-speed transmission as defined in claim 1 which further includes a driving shaft and a driven shaft arranged coaxially, an axially displaceble intermediate shaft located coaxially with and between said driving and driven shafts, said intermediate shaft being supported for rotation by the ends of said driving and driven shafts, wherein three concave cone wheels are mounted upon and rotated by said intermediate shaft, the middle one of said cone wheels being axially shiftable on said intermediate shaft and being provided with concave surfaces at its opposite sides which cooperate respectively with the concave surfaces of the two other cone wheels to establish two sets of opposing conical surfaces, wherein first and second sets of balls are provided in frictional engagement respectively with said sets of opposing conical surfaces, wherein said means for supporting said balls at a predetermined angular distance apart around the axis of said cone wheels comprises a non-rotational but axially displaceable carrier, wherein said ring which surrounds said cone wheels and balls includes first and second rotatable ring parts connected respectively to said driving and driven shafts and which include conical internal surfaces frictionally engaging respectively said first and second set of balls, means for shifting said carrier axially, and means for generating contact pressures between said cone wheels and said balls and said ring parts.

8. A variable-speed transmission as defined in claim 1 which further includes a driving shaft and a driven shaft arranged coaxially, wherein first and second pairs of opposing concave cone wheels are mounted respectively on said driving and driven shafts, each pair of cone wheels including a non-shiftable inner cone wheel and an axially shiftable outer cone wheel to establish first and second sets of opposing conical surfaces, wherein first and second sets of balls are provided in frictional engagement respectively with said first and second sets of opposing conical surfaces, wherein said means for supporting said balls at a predetermined angular distance apart around the axis of said cone wheels comprises a rotatable carrier located intermediate said inner cone wheels, wherein said ring which surrounds said cone whels and balls is non-rotational but axially displaceable and includes first and second conical internal surfaces frictionally engaging respectively said first and second sets of balls, means for shifting said ring axially, and means for generating contact pressures between said cone wheels and said balls and said ring.

9. A variable-speed transmission as defined in claim 1 which further includes a driving shaft and a driven shaft arranged coaxially, wherein three concave cone wheels are mounted upon and rotated by said driving shaft, the middle one of said cone wheels being axially shiftable on said driving shaft and being provided with concave surfaces at its opposite sides which cooperate respectively with the concave surfaces of the other two cone wheels to establish two sets of opposing conical surfaces, wherein first and second sets of balls are provided in frictional engagement respectively with said sets of opposing conical surfaces, wherein said means for supporting said balls at a predetermined distance apart around the axis of said cone wheels comprises a first stationary carrier for said first set of balls and a second rotatable carrier connected to said driven shaft for said second set of balls, wherein said ring which surrounds said cone wheels and balls is rotatable and includes first and second conical internal surfaces frictionally engaging said first and second sets of balls respectively, means for shifting said rotatable ring axially and means for generating contact pressures between said cone wheels and said balls and said rotatable ring.

References Cited
UNITED STATES PATENTS

| | | | |
|---|---|---|---|
| 1,298,560 | 3/1919 | Poppink | 74—796 |
| 1,380,006 | 5/1921 | Nielsen | 74—796 |
| 1,718,846 | 6/1929 | Arter | 74—796 |
| 1,800,388 | 4/1931 | Jacobson | 74—796 |
| 1,995,689 | 3/1935 | Shively | 74—198 X |
| 2,586,725 | 2/1952 | Schottler | 74—796 |

DONLEY J. STOCKING, *Primary Examiner.*

T. C. PERRY, *Assistant Examiner.*

U.S. Cl. X.R.

74—198, 705